UNITED STATES PATENT OFFICE.

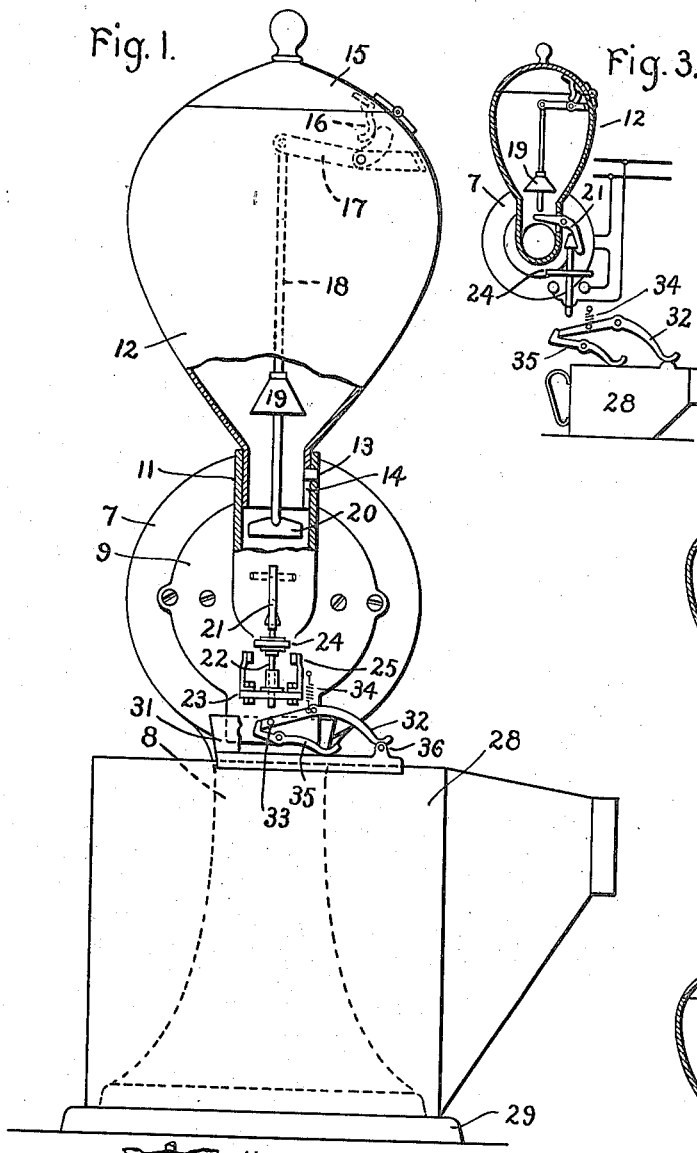

WILLIAM J. KEARY, OF SCHENECTADY, NEW YORK.

GRINDING-MILL.

1,238,784. Specification of Letters Patent. Patented Sept. 4, 1917.

Application filed June 25, 1917. Serial No. 176,720.

*To all whom it may concern:*

Be it known that I, WILLIAM J. KEARY, a citizen of the United States, residing at Schenectady, county of Schenectady, State of New York, have invented certain new and useful Improvements in Grinding-Mills, of which the following is a specification.

The present invention relates to motor driven grinding mills and more especially to mills for grinding coffee.

There are on the market at the present time coffee mills for use in stores, restaurants, etc., which are driven by electric motors and which are open to certain practical objections. As a general thing, the motors are of small capacity on account of relatively low cost, and should be running at full speed before the coffee is admitted to the grinding means or burs. It not infrequently happens, due to carelessness on the part of the user, that the coffee is admitted before the motor is started. In most cases this stalls the motor with the result of injuring it or blowing out a fuse or both. With the average help available in a grocery store this means a serious interruption to business. In those cases where, because the motor is larger or for any other reason, it is not stalled, the slow movement of the burs at the start tends to crush the coffee beans instead of grinding them, thus giving a non-uniform result. After the coffee is ground it is necessary for the operator to open the switch to stop the motor. The starting and stopping of the motor, while simple things merely requiring the movement of a small switch, is wholly in addition to the acts normally required of the user to grind coffee and hence are objectionable. If the motor is permitted to run longer than it should, either before or after grinding, a certain amount of electricity is wasted and this shows up, of course, in the monthly bills.

It has been proposed to use screw conveyers to feed the coffee to the burs with the idea of preventing the stalling of the motor, but they are objectionable because under certain conditions they actually force the beans forward too rapidly and choke the burs. The result of this is to crush the coffee instead of grinding it.

The object of my invention is to overcome the objections above noted, and also to provide a mill which is so constructed and arranged that the normal acts of the user in grinding the coffee automatically starts and stops the motor at the proper times and prevents the coffee beans from getting into the burs until the motor is running at its full or proper grinding speed. In other words, the object of my invention is to eliminate entirely from the mind of the user of the mill all thought of the motive power agent and its control.

For a consideration of what I believe to be novel and my invention, attention is directed to the accompanying description and the claims appended thereto.

In the accompanying drawing which illustrates one of the embodiments of my invention, Figure 1 is a view in elevation of a mill; Fig. 2 is a detail view with some of the parts broken away to expose the motor controlling switch; Figs. 3 to 6 are diagrammatic views illustrating the various steps in grinding coffee.

7 indicates an electric motor of any suitable character which is mounted on a suitable standard 8, shown in dotted lines. To the standard is attached a casing 9 for the usual grinding means 10. The casing is provided with an upwardly extending neck 11 in which is mounted the hopper 12 to receive the material, such as coffee to be ground. The hopper has a restricted neck that fits into the neck of the casing and is definitely positioned by the pin 13 carried by the casing and fitting into the slot 14. This permits the hopper to be removed by a vertical movement when for any reason it is desirable. The hopper is provided with a hinged cover 15 on which is a finger 16 that engages one arm of a bell-crank lever 17. To the other end of the lever is attached a rod 18 having at its lower end a valve 19 which, when the cover is thrown back, moves down and closes the outlet leading from the hopper into the grinding means. The purpose of this is to prevent the coffee or other material from passing from the hopper into the grinding means until after the motor has attained full speed. When the cover is closed, as shown in Fig. 1, the valve is raised and the coffee is free to move downward under the action of gravity in a smooth regular manner. On the lower end of the stem or actuator of the valve is a flat plate 20 which, when the valve is closed, by opening the cover engages the upper arm of a latch comprising in this case a bell-crank lever 21, the latter being pivotally supported in the lower part of the neck of the casing 9. The lower end of the latch has a hook which engages the shouldered head on the rod 22 of the motor controlling switch 23. The switch comprises a contact disk or bridge member 24 that controls the circuit between two stationary contact members 25. The switch is biased to the closed position. As shown, it closes by gravity when released by the latch 21, but other means can be employed for the purpose. When the user opens the cover in order to pour in the coffee or other material to be ground, the valve 19 closes and shuts off the outlet from the hopper. At or about the time the valve closes the flat plate 20 strikes the upper end of the latch 21 and releases the switch, which immediately closes the motor circuit. Before the material can be completely poured into the hopper the motor is operating at full speed to drive the grinding burs. When the cover is closed, the valve 19 is raised and the coffee permitted to freely flow into the grinding means. From the foregoing it will be seen, first, that the user has not been obliged to give any attention to the motor or its control, and second, that all tendency for the motor to stall is overcome.

The next thing to consider is the removal of the ground material. For this purpose a receiver 28 of usual size and shape is provided which slides along the counter or other support in guides 29 until its mouth registers with the outlet 30 of the mill. Around the mouth is a U-shaped guard 31 to prevent the coffee from spilling over the sides of the receiver. Associated with the receiver is a means for stopping the motor when it is removed. The user can readily determine by the sound of the apparatus when the grinding is finished. Situated above the receiver and carried by some part of the mill, as the casing 9, is a switch opening device comprising a lever 32 pivoted between its ends. One end of the lever may be arranged to strike the switch rod 22 when moved upwardly, or it may act indirectly as through the pin 33. The actuating device 32 is biased to open the switch, as by gravity, or the spring 34, and is normally restrained by the pivotally supported catch 35, one end of which engages and holds the device, the other end being heavier to move it to place. The right-hand ends of the releasing device 32 and catch 35 are curved to permit them to ride over a cam or projection 36 on the receiver. In the present case the cam is formed by a pin that is mounted in a wall of the guard. When the receiver is pulled back from under the outlet 30 for the purpose of emptying the coffee, Fig. 6, the cam 36 moves out from under the device 32, thus releasing it, and then raises the curved end of the catch 35 causing it to release said device. This permits spring 34 to act and open the switch, and at the same time moves the enlarged head on the switch rod 22 into engagement with the latch 21. In other words, the cam starts a series of actions that first break the circuit of the motor and then reset the switch. When the receiver is slid into place under the outlet 30, the cam rides under the catch 35 and the flat surface 37 directly behind it holds the same in approximately the position to receive the releasing device 32 when its right-hand end is raised by the cam, as shown in Fig. 5. It is necessary to move the device 32 out of the path of the switch rod after the switch is reset to permit it to close when released by the latch 21. The fact that the centers of the device 32 and catch 35 are displaced sidewise, as shown, insures the proper engagement of the parts when the receiver is slid into place. It will be seen that the act of removing the receiver opens the motor circuit and resets the switch, and that returning the receiver resets the switch releasing means. Figs. 3 to 6 inclusive show very clearly the various steps that take place from start to finish. It is also to be observed that the motor cannot be started until after the receiver is returned to place, because the spring 34 will hold the switch open.

It is apparent from the foregoing that the user merely has to pour the coffee into the hopper, close the cover, and remove the material when ground, paying absolutely no heed to the electrical part of the mill which takes care of itself.

The switch and its actuating means are entirely inclosed by a covering which has been removed, however, to simplify the illustration.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a grinding mill, the combination of a grinding means, a motor for driving it, means actuated by the opening of the mill to receive material for starting the motor, and means actuated by the removal of ground material from the mill to stop the motor.

2. In a grinding mill, the combination of a grinding means, a motor for driving it, a controller for the motor, a device actuated by the opening of the mill to receive material for causing the controller to start the motor, and a device actuated by the removal of ground material from the mill to cause the controller to stop the motor.

3. In a grinding mill, the combination of grinding means, an electric driving motor therefor, a switch for controlling the motor, a hopper, means responsive to the movement of a part of the hopper for actuating the switch, a receiver for the ground material, and means responsive to a movement of the receiver for also actuating the switch.

4. In a grinding mill, the combination of a grinding means, an electric driving motor therefor, a switch for controlling the motor, a hopper having a movable member, a means actuated by the opening movement of the member to move the switch, a receiver for the ground material, and means responsive to a movement of the receiver to also move the switch.

5. In a grinding mill, the combination of grinding means, an electric driving motor therefor, a switch that is biased to its closed position for controlling the motor, a normally closed hopper, means controlled by the opening of the hopper which releases the switch, a receiver for ground material, and means actuated by the receiver for opening the switch.

6. In a grinding mill, the combination of grinding means, an electric driving motor therefor, a switch that is biased to its closed position for controlling the motor, a latch for holding the switch open, means responsive to a movement of some part of the hopper for releasing the latch, a receiver for ground material, and means actuated by the receiver for opening the switch and resetting the latch.

7. In a grinding mill, the combination of a grinding means, an electric motor for driving the means, a switch for the motor which is biased to close, a hopper having a cover which is closed when the mill is in operation, a valve controlling the outlet from the hopper into the grinding means which is held open by the cover when shut and is biased to close, the opening of said cover causing both said switch and valve to close and the motor to start, a receiver for the ground material, and means actuated by the movement of the receiver to open the switch and stop the motor.

8. In a grinding mill, the combination of grinding means, an electric motor for driving the means, a switch for the motor that is normally open, a hopper, a valve that controls the passage of material from the hopper, an actuator common to the valve and switch which causes them to close by the same movement, a receiver, and means carried by the receiver for opening the switch.

9. In a grinding mill, the combination of a grinding means, an electric motor for driving the means, a switch for the motor, a latch which normally holds the switch open, a device for opening the switch and then resetting it and the latch, and a receiver which as it is moved actuates the device.

10. In a grinding mill, the combination of a grinding means, an electric motor for driving the means, a switch for the motor, a latch which normally holds the switch open, means for releasing the latch, a device for moving the switch into reëngagement with the latch after each operation, a catch for holding the device out of action, and a receiver for material from the mill which releases the device when moved outwardly and resets it and the catch when returned to place.

11. In a grinding mill, the combination of a grinding means, an electric motor for driving the means, a normally open switch for the motor, a hopper, a normally open valve in the outlet of the hopper, means causing the cover to release the valve as it is opened and to raise the valve when it is shut, a receiver for ground material, and means actuated by the receiver when moved in one direction to open the switch.

12. In a grinding mill, the combination of grinding means, a driving motor therefor, a hopper, a receiver for ground material, a switch for controlling the motor, means actuated by the opening of the hopper to close the switch, and means actuated by the removal of the receiver which open the switch and reset it for further operation.

13. In a grinding mill, the combination of grinding means, a driving motor therefor, a hopper having a movable member, a valve in the hopper, a receiver for ground material, a switch for controlling the motor, means actuated by the member when moved in one direction for closing the valve switch and for opening the valve when returned to initial position, and a receiver for ground material.

14. In a grinding mill, the combination of grinding means, a driving motor therefor, a hopper having a hinged cover, a valve in the outlet of the hopper, an actuator for the valve which is moved by the cover in opening and closing, a switch for the motor that is biased to close, a releasing device for the switch controlled by the actuator, a switch opening and resetting means, and a receiver for ground material which by its movements controls said means.

In witness whereof, I have hereunto set my hand this 22nd day of June, 1917.

WILLIAM J. KEARY.

Witnesses:
 HORACE W. RAYMOND,
 A. F. MACDONALD.